US010385194B2

(12) United States Patent
Kela et al.

(10) Patent No.: US 10,385,194 B2
(45) Date of Patent: *Aug. 20, 2019

(54) POLYETHYLENE COMPOSITION FOR A FILM LAYER (71) Applicant: Borealis AG, Vienna (AT)

(72) Inventors: Jarmo Kela, Porvoo (FI); Peter Niedersuss, Ried/Riedmark (AT); Jari Aarila, Porvoo (FI); Markku Vahteri, Porvoo (FI); Floran Prades, Linz (AT); John Jamieson, Porvoo (FI); Willem De Wever, Hasselt (BE)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/527,993

(22) PCT Filed: Nov. 18, 2015

(86) PCT No.: PCT/EP2015/076960
§ 371 (c)(1),
(2) Date: May 18, 2017

(87) PCT Pub. No.: WO2016/083208
PCT Pub. Date: Jun. 2, 2016

(65) Prior Publication Data
US 2017/0327678 A1 Nov. 16, 2017

(30) Foreign Application Priority Data
Nov. 26, 2014 (EP) .................................. 14194867

(51) Int. Cl.
*C08J 5/18* (2006.01)
*C08L 23/08* (2006.01)

(52) U.S. Cl.
CPC ............. *C08L 23/0815* (2013.01); *C08J 5/18* (2013.01); *C08J 2323/08* (2013.01); *C08J 2423/08* (2013.01); *C08L 2203/162* (2013.01); *C08L 2205/025* (2013.01); *C08L 2308/00* (2013.01); *C08L 2314/06* (2013.01)

(58) Field of Classification Search
CPC ...... C08J 5/18; C08J 2423/08; C08J 2323/08; C08L 23/0815; C08L 2203/162; C08L 2205/025; C08L 2314/06; C08L 2308/00
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,543,399 A | 9/1985 | Jenkins et al. |
| 4,582,816 A | 4/1986 | Miro |
| 4,621,952 A | 11/1986 | Aronson |
| 5,391,654 A | 2/1995 | Ahvenainen et al. |
| 2010/0029883 A1 | 2/2010 | Krajete et al. |
| 2010/0261848 A1* | 10/2010 | Wang .................. B29C 45/0001 525/240 |
| 2014/0069547 A1* | 3/2014 | Noopila et al. ... C09D 123/0815 138/145 |
| 2014/0171582 A1* | 6/2014 | Wang et al. ........ C08L 23/0815 524/528 |
| 2016/0122448 A1* | 5/2016 | Buryak et al. ....... C09D 123/06 526/64 |
| 2018/0346622 A1* | 12/2018 | Kela et al. .............. B32B 27/08 |

FOREIGN PATENT DOCUMENTS

| | | |
|---|---|---|
| CN | 1628135 A | 6/2005 |
| CN | 101103058 A | 1/2008 |
| EP | 188125 A2 | 7/1986 |
| EP | 250169 A2 | 12/1987 |
| EP | 579426 A1 | 1/1994 |
| EP | 699213 B1 | 2/1998 |
| EP | 887379 A1 | 12/1998 |
| EP | 887380 A1 | 12/1998 |
| EP | 887381 A1 | 12/1998 |
| EP | 696293 B1 | 5/2000 |
| EP | 1310295 A1 | 5/2003 |
| EP | 1333044 A1 | 8/2003 |
| EP | 1415999 A1 | 5/2004 |
| EP | 1472298 B1 | 9/2005 |
| EP | 1591460 A1 | 11/2005 |
| EP | 991684 B1 | 1/2006 |
| EP | 1674490 A1 | 6/2006 |
| EP | 1739103 A1 | 1/2007 |
| EP | 1752462 A1 | 2/2007 |
| KR | 2004-0088487 A | 10/2004 |
| WO | 92/12182 A1 | 7/1992 |
| WO | 94/25495 A1 | 11/1994 |
| WO | 95/12622 A1 | 5/1995 |
| WO | 96/32423 A1 | 4/1996 |
| WO | 96/18662 A1 | 6/1996 |
| WO | 97/28170 A1 | 8/1997 |
| WO | 98/32776 A1 | 7/1998 |
| WO | 99/61489 A1 | 12/1999 |
| WO | 00/26258 A1 | 5/2000 |
| WO | 00/29452 A1 | 5/2000 |
| WO | 03/010208 A1 | 2/2003 |
| WO | 03/051514 A1 | 6/2003 |
| WO | 03/051934 A2 | 6/2003 |
| WO | 2004/085499 A2 | 10/2004 |
| WO | 2007/025640 A1 | 3/2007 |

OTHER PUBLICATIONS

Office action for Korean Patent Application No. 10-2017-7016747, dated Dec. 8, 2017.
European Search Report for Application No. 14194867.9-1302, dated May 27, 2015.
Zhou, et al., "A new decoupling method for accurate quantification of polyethylene copolymer composition and triad sequence distribution with 13C NMR", Journal of Magnetic Resonance 187, (2007), pp. 225-233.

(Continued)

Primary Examiner — Nathan M Nutter
(74) Attorney, Agent, or Firm — Tarolli, Sundheim, Covell & Tummino LLP (57) ABSTRACT

The present invention relates to a polymer composition, to the use of the polymer composition in film applications and to a film comprising the polymer composition of the invention.

17 Claims, 1 Drawing Sheet

(56) References Cited

OTHER PUBLICATIONS

Resconi, et al., "Selectivity in Propene Polymerization with Metallocene Catalysts", Chem. Rev. 2000, pp. 1253-1345.

Kaye, et al., "Definition of Terms Relating to the Non-Ultimate Mechanical Properties of Polymers", Pure & Appl. CHem., vol. 70, 1998, pp. 701-754.

Pollard, et al., "Observation of Chain Branching in Polyethylene in the Solid State and Melt via 13C NMR Spectroscopy and Melt NMR Relaxation Time Measurements", Macromolecules 2004, pp. 813-825.

Klimke, et al., "Optimisation and Application of Polyolefin Branch Quantification by Melt-State 13C NMR Spectroscopy", Macromol. Chem. Phys. 2006, pp. 382-395.

Heino, E-L, et al., "Rheological Characterization of Polyethylene Fractions", Proc. XIth Int. Congr. on Rheology, Brussels, Belgium, Aug. 17-21, 1992, pp. 360-362.

Filip, et al., "Heteronuclear decoupling under fast MAS by a rotor-synchronized Hahn-echo pulse train", Journal of Magnetic Resonance, (2005), pp. 239-243.

Gastignolles, et al. "Detection and quantification of branching in polyacrylates by size-exclusion chromatography (SEC) and melt-state 13C NMR spectroscopy", (2009), pp. 2373-2383.

Busico, et al., "Full Assignment of the 13C NMR Spectra of Regioregular Polypropylenes: Methyl and Methylene Region", Macromolecules 1997, pp. 6251-6263.

Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.

Busico, et al., "Microstructure of polypropylene", Prog. Polym. Sci. 26, (2001), pp. 443-533.

Chinese Office action for Patent No. 201580063427.9, dated Jun. 11, 2019.

* cited by examiner

■ reference products ♦ Inventive examples

POLYETHYLENE COMPOSITION FOR A FILM LAYER

The present invention relates to a polymer composition, to the use of the polymer composition in film applications and to a film comprising the polymer composition of the invention.

Unimodal polyethylene (PE) polymers, for instance SSC products, are usually used for film application. Unimodal PE polymers have for instance good optical properties, like low haze, but for instance the melt processing of such polymers is not satisfactory in production point of view and may cause quality problems of the final product as well. Multimodal PE polymers with two or more different polymer components are better to process, but e.g. melt homogenisation of the multimodal PE may be problematic resulting to inhomogeneous final product evidenced e.g. with high gel content of the final product.

EP1472298A of Borealis discloses multimodal PE polymer compositions having two different comonomers. The multimodal PE polymers are polymerised in the presence of a metallocene catalyst. Examples disclose multimodal PE polymer having two polymer components with, for instance, different type of comonomers. The publication does seem to define any range for the melt flow ratio, $MFR_{21}/MFR_2$ ($FRR_{21/2}$), of the final multimodal PE polymer, however said melt flow ratio of the exemplified polymers vary within the range of 38-55.

There is a continuous need to find multimodal PE polymers with different property balances for providing tailored solutions to meet the increasing demands of the end application producers e.g. for reducing the production costs while maintaining or even improving the end product properties. Tailored polymer solutions are also needed to meet the requirements of continuously developing equipment technology in the end application field.

BRIEF DESCRIPTION OF THE FIGURE

The Drawing FIGURE shows the relationship of Hot tack temperature and Tensile modulus. ■ reference products ♦ Inventive examples

DESCRIPTION OF THE INVENTION

Figure 1:
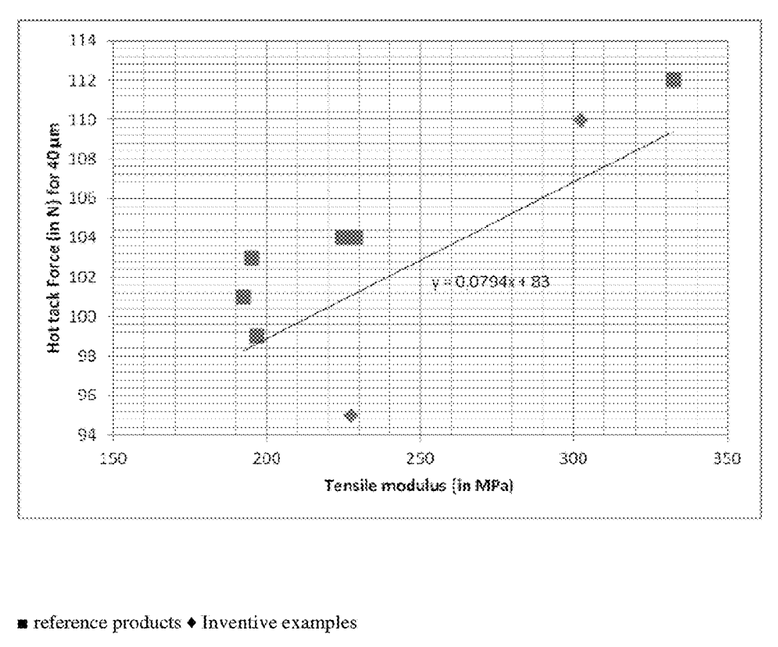

The present invention is directed to a polymer composition comprising (a) a multimodal polymer of ethylene with at least two different comonomers selected from alpha-olefins having from 4 to 10 carbon atoms, wherein multimodal polymer of ethylene (a) has a) $MFR_2$ of 0.5 to 10 g/10 min (according to ISO 1133 at 190° C. under 2.16 kg load), b) $MFR_{21}/MFR_2$ of 13 to 35 ($MFR_{21}$ at 190° C. under 21.6 kg load) and c) MWD of 5 or less;

and wherein multimodal polymer of ethylene (a) comprises at least an ethylene polymer component (A) and
an ethylene polymer component (B), and wherein the $MFR_2$ of the ethylene polymer component (A) is different from the $MFR_2$ of the ethylene polymer component (B).

Term "multimodal" in context of polymer of ethylene (a) means herein multimodality with respect to melt flow rate (MFR) of the ethylene polymer components (A) and (B), i.e. the ethylene polymer components (A) and (B) have different MFR values. The multimodal polymer of ethylene (a) can have further multimodality with respect to one or more further properties between the ethylene polymer components (A) and (B), as will be described later below.

The polymer composition of the invention as defined above, below or in claims is also referred herein shortly as "polymer composition".

The "(a) a multimodal polymer of ethylene with at least two different comonomers selected from alpha-olefins having from 4 to 10 carbon atoms" or, respectively, "the multimodal polymer of ethylene (a)" as defined above, below or in claims is also referred herein shortly as "polymer of ethylene (a)".

The ethylene polymer component (A) and the ethylene polymer component (B), when both mentioned, are also be referred as "ethylene polymer component (A) and (B)".

Unexpectedly the polymer composition of the invention provides a flexibility to tailor polymer structure to be the most suitable for selected application.

Surprisingly the claimed property combination of the polymer composition of the invention, i.e. comprising two different comonomers and having a narrow MWD, specific $MFR_{21}/MFR_2$ ratio combined with multimodality with respect to MFR, provides an excellent property balance to the polymer composition, for example an advantageous balance between processability, indicated e.g. as markedly reduced extruder pressure compared to unimodal polymers, combined with improved homogeneity, indicated e.g. as low content of gels compared to "broader" multimodal ethylene polymers.

Preferably in addition to above excellent property balance achieved with the claimed present polymer composition also the mechanical properties, for instance a higher stiffness (expressed e.g. as higher tensile modulus in machine direction (MD)), are improved compared e.g. to unimodal ethylene polymer having the same final density.

Further preferably, the polymer composition of the invention has excellent sealing properties, indicated e.g. as low hot tack temperature at maximum hot tack force. The polymer composition also provides sealing initiation even in low temperatures.

Moreover, with the property balance of the invention the polymer composition, although multimodal, provides good optical properties, like very feasible haze values.

The obtained property balance is highly feasible e.g. for film applications.

The invention is further directed to a film comprising at least one layer comprising the polymer composition. The film can be a monolayer film comprising the polymer composition or a multilayer film, wherein at least one layer comprises the polymer composition. The terms "monolayer film" and multilayer film" have well known meanings in the art.

The following preferable embodiments, properties and subgroups of the polymer composition, polymer of ethylene (a) and the ethylene polymer components (A) and (B) thereof and the film of the invention including the preferable ranges thereof, are independently generalisable so that they can be used in any order or combination to further define the preferable embodiments of the polymer composition and the article of the invention.

Polymer Composition, Polymer of Ethylene (a) as Well as Ethylene Polymer Component (A) and Ethylene Polymer Component (B)

As already mentioned above, the polymer of ethylene (a) is referred herein as "multimodal", since the ethylene polymer component (A) and the ethylene polymer component (B) have been produced under different polymerization conditions resulting in different Melt Flow Rates (MFR, e.g. $MFR_2$). I.e. the polymer composition is multimodal at least with respect to difference in MFR of the two ethylene polymer components (A) and (B). The term "multi" includes "bimodal" composition consisting of two components having the difference in said MFR.

Preferably, the ethylene polymer component (A) has a $MFR_2$ of 1 to 50 g/10 min, preferably of 1 to 40, more preferably of 1 to 30, more preferably of 2 to 20, more preferably of 2 to 15, even more preferably of 2 to 10, g/10 min. More preferably, the ethylene polymer component (A) has higher $MFR_2$ than ethylene polymer component (B).

Even more preferably, the ratio of the $MFR_2$ of ethylene polymer component (A) to the $MFR_2$ of the final multimodal polymer of ethylene (a) is of 2 to 50, preferably of 5 to 40, preferably of 10 to 30, more preferably of 10 to 25, more preferably of 15 to 25.

Preferably, $MFR_2$ of the polymer composition, preferably the polymer of ethylene (a), is preferably of 0.5 to 7, preferably of 0.5 to 5, g/10 min. Preferably the polymer composition, preferably the polymer of ethylene (a), has $MFR_{21}/MFR_2$ of 13 to 30, preferably of 15 to 30, more preferably of 15 to 25.

If the $MFR_2$ of ethylene polymer components, e.g. component (B), can not be measured, because it cannot be isolated from the mixture of at least ethylene polymer components (A) or (B), then it can be calculated ($MI_2$ below) using so called Hagström equation (Hagström, The Polymer Processing Society, Europe/Africa Region Meeting, Gothenburg, Sweden, Aug. 19-21, 1997):

$$MI_b = \left( w \cdot MI_1^{\frac{w-b}{a}} + (1-w) \cdot MI_2^{\frac{w-b}{a}} \right)^{-a \cdot w^b} \quad \text{(eq. 3)}$$

According to said Hagström, in said equation (eq. 3), a=5.2 and b=0.7 for $MFR_2$. Furthermore, w is the weight fraction of the other ethylene polymer component, e.g. component (A), having higher MFR. The ethylene polymer component (A) can thus be taken as the component 1 and the ethylene polymer component (B) as the component 2. $MI_b$ is the $MFR_2$ of the final polymer of ethylene (a). The $MFR_2$ of the ethylene polymer component (B) ($MI_2$) can then be solved from equation 1 when the $MFR_1$ of the ethylene polymer component (A) ($MI_1$) and the final polymer of ethylene (a) ($MI_b$) are known.

The at least two alpha-olefin comonomers having from 4 to 10 carbon atoms of the polymer of ethylene (a) are preferably 1-butene and 1-hexene.

Naturally, in addition to multimodality with respect to, i.e. difference between, the MFR of the ethylene polymer components (A) and (B), the polymer of ethylene (a) of polymer composition of the invention can also be multimodal e.g. with respect to one or both of the two further properties:

multimodality with respect to, i.e. difference between,
the comonomer type or the comonomer content(s) present in the ethylene polymer components (A) and (B), or both the type and content(s) of comonomers present in the ethylene polymer components (A) and (B); and/or
the density of the ethylene polymer components (A) and (B).

Preferably, the multimodal polymer of ethylene (a) of the polymer composition is further multimodal with respect to comonomer type and/or comonomer content (mol-%), preferably wherein the alpha-olefin comonomer having from 4 to 10 carbon atoms of ethylene polymer component (A) is different from the alpha-olefin comonomer having from 4 to 10 carbon atoms of ethylene polymer component (B), preferably wherein the alpha-olefin comonomer having from 4 to 10 carbon atoms of ethylene polymer component (A) is 1-butene and the alpha-olefin comonomer having from 4 to 10 carbon atoms of ethylene polymer component (B) is 1-hexene.

Preferably, the ratio of [the amount (mol %) of alpha-olefin comonomer having from 4 to 10 carbon atoms comonomer present in ethylene polymer component (A)] to [the amount (mol %) of at least two alpha-olefin comonomers having from 4 to 10 carbon atoms of the final multimodal polymer of ethylene (a)] is of 0.2 to 0.6, preferably of 0.24 to 0.5, more preferably the ethylene polymer component (A) has lower amount (mol %) of comonomer than the ethylene polymer component (B).

The comonomer content of component (A) and (B) can be measured, or, in case, and preferably, one of the components is produced first and the other thereafter in the presence of the first produced in so called multistage process, then the comonomer content of the first produced component, e.g. component (A), can be measured and the comonomer content of the other component, e.g. component (B), can be calculated according to following formula:

Comonomer content (mol-%) in component B=(comonomer content (mol-%) in final product−(weight fraction of component A*comonomer content (mol-%) in component A))/(weight fraction of component B)

Preferably, the amount (mol %) of alpha-olefin comonomer having from 4 to 10 carbon atoms present in the ethylene polymer component (A) is of 0.03 to 5.0 mol %, preferably of 0.05 to 4.0 mol %, more preferably of 0.1 to 3.0 mol %, even more preferably of 0.1 to 2.0 mol %, more preferably of 0.15 to 1.5 mol %, even more preferably of 0.15 to 1.0 mol %.

More preferably, the total amount of comonomers present in the multimodal polymer of ethylene (a) is of 0.5 to 10 mol %, preferably of 1.0 to 8 mol %, more preferably of 1.0 to 5 mol %, more preferably of 1.5 to 5.0 mol %.

The further specific multimodality, i.e. the difference between, the comonomer type and comonomer content between the ethylene polymer component (A) and the ethylene polymer component (B) further contributes to highly advantageous sealing properties, e.g. to improved hot tack properties as mentioned above and preferably also to the excellent sealing initiation temperature even in low temperatures. Also the optical properties, like haze, are in advantageous level.

Even more preferably the multimodal polymer of ethylene (a) of the polymer composition is further multimodal with respect to difference in density between the ethylene polymer component (A) and ethylene polymer component (B). Preferably, the density of ethylene polymer component (A) is different, preferably higher, than the density of the ethylene polymer component (B). More preferably the density of the ethylene polymer component (A) is of 925 to 950, preferably of 930 to 945, kg/m³.

The multimodal polymer of ethylene (a) is preferably a linear low density polyethylene (LLDPE) which has a well known meaning. Even more preferably the density of the multimodal polymer of ethylene (a), preferably of the polymer composition, is of 910 to 935, preferably of 915 to 930, kg/m³.

The multimodality with respect to density further contributes to the beneficial mechanical properties of the polymer composition.

Additionally, the polymer of ethylene (a) of the polymer composition can also be multimodal with respect to, i.e. have difference between, the (weight average) molecular weight of the ethylene polymer components (A) and (B). The multimodality re weight average molecular weight means that the form of the molecular weight distribution curve, i.e. the appearance of the graph of the polymer weight fraction as function of its molecular weight, of such a multimodal polyethylene will show two or more maxima or at least be distinctly broadened in comparison with the curves for the individual components.

More preferably the multimodal polymer of ethylene (a) is multimodal at least with respect to, i.e. has a difference between, the $MFR_2$, the comonomer type and the comonomer content (mol %), as well as with respect to, i.e. has a difference between, the density of the ethylene polymer component (A) and ethylene polymer component (B), as defined above, below or claims including any of the preferable ranges or embodiments of the polymer composition.

Most preferably the polymer composition of the invention, as defined above, below or in claims, comprises a multimodal polymer of ethylene (a) comprising, preferably consisting of, an ethylene polymer component (A) and an ethylene polymer component (B), wherein
  the ethylene polymer component (A) has higher $MFR_2$ than ethylene polymer component (B);
  more preferably, the ethylene polymer component (A) has $MFR_2$ of 1 to 50 g/10 min, preferably of 1 to 40 g/10 min, more preferably of 1 to 30 g/10 min, more preferably of 2 to 20 g/10 min, more preferably of 2 to 15 g/10 min, even more preferably of 2 to 10 g/10 min;
  even more preferably, the ratio of the $MFR_2$ of ethylene polymer component (A) to the $MFR_2$ of the final multimodal polymer of ethylene (a) is of 2 to 50, preferably of 5 to 40, preferably of 10 to 30, more preferably of 10 to 25, more preferably of 15 to 25;
  and wherein
  the ethylene polymer component (A) has different comonomer than the ethylene
  more preferably, the ethylene polymer component (A) has lower amount (mol %) of comonomer than the ethylene polymer component (B), even more preferably, the ratio of [the amount (mol %) of alpha-olefin comonomer having from 4 to 10 carbon atoms comonomer present in ethylene polymer component (A)] to [the amount (mol %) of at least two alpha-olefin comonomers having from 4 to 10 carbon atoms of the final multimodal polymer of ethylene (a)] is of 0.2 to 0.6, preferably of 0.25 to 0.5;
  even more preferably, wherein the alpha-olefin comonomer having from 4 to 10 carbon atoms of ethylene polymer component (A) is 1-butene and the alpha-olefin comonomer having from 4 to 10 carbon atoms of ethylene polymer component (B) is 1-hexene;
  and wherein
  the ethylene polymer component (A) has different, preferably higher, density than the density of the ethylene polymer component (B);
more preferably density of the multimodal polymer of ethylene (a), preferably of the polymer composition, is of 910 to 935 kg/m³, preferably of 915 to 930 kg/m³;
  even more preferably of the density of the ethylene polymer component (A) is of 925 to 950 kg/m³, preferably of 930 to 945 kg/m³.

The polymer composition, preferably the multimodal polymer of ethylene (a), has preferably a shear thinning value, $SHI_{2.7/210}$, of 1.5 to 7, preferably of 2 to 3.5, when determined according to the "Dynamic Shear Measurements" as defined below under Determination methods.

The polymer composition, preferably the multimodal polymer of ethylene (a), has preferably a tensile modulus in machine direction (MD) of 200 to 350 MPa, preferably 210 to 330 MPa, when determined according to ISO 527-1 and ISO 527-3 and measured from a film sample (40 μm thickness) consisting of the polymer composition, as described below under "Determination methods".

The polymer composition, preferably the multimodal polymer of ethylene (a), has preferably a following correlation between tensile modulus in MD direction for 40 μm film and hot tack temperature (lowest temperature to get maximum hot tack force):

Hot Tack Temperature <0.0794 Tensile Modulus in MD+83.

The determination of tensile modulus in MD and hot tack temperature are defined as described below under "Determination methods".

The polymer composition has preferably a hot tack temperature of less than 112° C. when measured according to ASTM F 1921-98 (2004), method B and measured from a film sample (40 μm thickness) consisting of the polymer composition as described above under "Determination methods". Preferably the hot tack temperature is 80° C. or more. More preferably the hot tack temperature is of 111 to 85° C.

Further preferably, the polymer composition has a Hot tack (maximum hot tack force) of 1.95 N or more, when measured according to ASTM F 1921-98 (2004), method B and measured from a film sample (40 μm thickness) consisting of the polymer composition as described above under "Determination methods". Preferably the hot tack is up to 5.0 N. More preferably the hot tack is of 2.1 to 5.0 N.

Preferably, the multimodal polymer of ethylene (a) comprises the ethylene polymer component (A) in an amount of 30 to 70 wt %, preferably of 40 to 60 wt %, more preferably of 35 to 50 wt %, more preferably 40 to 50 wt % and the ethylene polymer component (B) in an amount of 70 to 30 wt %, preferably of 60 to 40 wt %, more preferably of 50 to 65 wt %, more preferably 50 to 60 wt %, based on the total amount (100 wt %) of the polymer of ethylene (a). Most preferably, the polymer of ethylene (a) consists of the ethylene polymer components (A) and (B) as the sole polymer components. Accordingly, the split between ethylene polymer component (A) to ethylene polymer component (B) is of (30 to 70):(70 to 30) preferably of (40 to 60):(60 to 40), more preferably of (35 to 50):(65 to 50), more preferably of (40 to 50):(50 to 60), wt %.

The polymer composition may contain further polymer components and optionally additives and/or fillers. It is noted herein that additives may be present in the polymer of ethylene (a) and/or mixed with the polymer of ethylene (a) e.g. in a compounding step for producing the polymer composition. In case the polymer composition contains further polymer components, then the amount of the further polymer component(s) typically varies between 3 to 20 wt % based on the combined amount of the polymer of ethylene (a) and the other polymer component(s).

The optional additives and fillers and the used amounts thereof are conventional in the field of film applications. Examples of such additives are, among others, antioxidants, process stabilizers, UV-stabilizers, pigments, fillers, antistatic additives, antiblock agents, nucleating agents, acid scavengers as well as polymer processing agent (PPA).

It is understood herein that any of the additives and/or fillers can optionally be added in so called master batch which comprises the respective additive(s) together with a carrier polymer. In such case the carrier polymer is not calculated to the polymer components of the polymer composition, but to the amount of the respective additive(s), based on the total amount of polymer composition (100 wt %).

Preferably the polymer composition comprises at least 80 wt % of polymer of ethylene (a) based on the total amount (100 wt %) of the polymer composition and optionally, and preferably, additives.

It is noted herein, that the polymer of ethylene (a) may optionally comprise a prepolymer component in an amount up to 20 wt % which has a well-known meaning in the art. In such case the prepolymer component is calculated in one of the ethylene polymer components (A) or (B), preferably in an amount of the ethylene polymer component (A), based on the total amount of the polymer of ethylene (a).

Accordingly, the multimodal polymer of ethylene (a) is preferably produced using a coordination catalyst. More preferably, the ethylene polymer components (A) and (B) of the polymer of ethylene (a) are preferably produced using a single site catalyst, which includes metallocene catalyst and non-metallocene catalyst, which all terms have a well-known meaning in the art. The term "single site catalyst" means herein the catalytically active metallocene compound or complex combined with a cocatalyst. The metallocene compound or complex is referred herein also as organometallic compound (C).

The organometallic compound (C) comprises a transition metal (M) of Group 3 to 10 of the Periodic Table (IUPAC 2007) or of an actinide or lanthanide.

The term "an organometallic compound (C)" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In an embodiment the organometallic compound (C) has the following formula (I):

$$(L)_m R_n MX_q \qquad (I)$$

wherein

"M" is a transition metal (M) transition metal (M) of Group 3 to 10 of the Periodic Table (IUPAC 2007), each "X" is independently a monoanionic ligand, such as a 6-ligand, each "L" is independently an organic ligand which coordinates to the transition metal "M", "R" is a bridging group linking said organic ligands (L), "m" is 1, 2 or 3, preferably 2

"n" is 0, 1 or 2, preferably 1,

"q" is 1, 2 or 3, preferably 2 and m+q is equal to the valency of the transition metal (M).

"M" is preferably selected from the group consisting of zirconium (Zr), hafnium (Hf), or titanium (Ti), more preferably selected from the group consisting of zirconium (Zr) and hafnium (Hf). "X" is preferably a halogen, most preferably Cl.

Most preferably the organometallic compound (C) is a metallocene complex which comprises a transition metal compound, as defined above, which contains a cyclopentadienyl, indenyl or fluorenyl ligand as the substituent "L". Further, the ligands "L" may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103

Most preferred single site catalyst is a metallocene catalyst which means the catalytically active metallocene complex, as defined above, together with a cocatalyst, which is also known as an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

More preferably the ethylene polymer components (A) and (B) of the polymer of ethylene (a) are produced using, i.e. in the presence of, the same metallocene catalyst.

The multimodal polymer of ethylene (a) may be produced in any suitable polymerization process known in the art. Into the polymerization zone is also introduced ethylene, optionally an inert diluent, and optionally hydrogen and/or comonomer. The ethylene polymer component (A) is preferably produced in a first polymerization zone and the ethylene polymer component (B) is produced in a second polymerization zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations. Suitable processes comprising cascaded slurry and gas phase polymerization stages are disclosed, among others, in WO-A-92/12182 and WO-A-96/18662.

It is often preferred to remove the reactants of the preceding polymerization stage from the polymer before introducing it into the subsequent polymerization stage. This is preferably done when transferring the polymer from one polymerization stage to another.

The catalyst may be transferred into the polymerization zone by any means known in the art. For example, it is possible to suspend the catalyst in a diluent and maintain it as homogeneous slurry, to mix the catalyst with a viscous mixture of grease and oil and feed the resultant paste into the polymerization zone or to let the catalyst settle and introduce portions of thus obtained catalyst mud into the polymerization zone.

The polymerization, preferably of the ethylene polymer component (A), in the first polymerization zone is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons and preferred diluent is propane.

The ethylene content in the fluid phase of the slurry may be from 2 to about 50% by mole, preferably from about 2 to about 20% by mole and in particular from about 3 to about 12% by mole.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art. Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

The polymerization, preferably of the ethylene polymer component (B), in the second polymerization zone is preferably conducted in gas phase, preferably in a fluidized bed reactor, in a fast fluidized bed reactor or in a settled bed reactor or in any combination of these. The polymerization in the second polymerization zone is more preferably conducted in a fluidized bed gas phase reactor, wherein ethylene is polymerized together with at least one comonomer in the presence of a polymerization catalyst and, preferably in the presence of the reaction mixture from the first polymerization zone comprising the ethylene polymer component (A) in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed.

Typically the fluidized bed polymerization reactor is operated at a temperature within the range of from 50 to 100° C., preferably from 65 to 90° C. The pressure is suitably from 10 to 40 bar, preferably from 15 to 30 bar.

The polymerization of at least ethylene polymer component (A) and ethylene polymer component (B) in the first and second polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 40 to 70° C.

The pressure is not critical and is typically from 1 to 150 bar, preferably from 10 to 100 bar. The catalyst components are preferably all introduced to the prepolymerization step. Preferably the reaction product of the prepolymerization step is then introduced to the first polymerization zone. Also preferably, as mentioned above, the prepolymer component is calculated to the amount of the ethylene polymer component (A).

It is within the knowledge of a skilled person to adapt the polymerization conditions in each step as well as feed streams and resident times to obtain the claimed multimodal polymer of ethylene (a).

The multimodal polymer of ethylene (a) comprising at least, and preferably solely, the ethylene polymer components (A) and (B) obtained from the second polymerization zone, which is preferably a gas phase reactor as described above, is the subjected to conventional post reactor treatment to remove i.a. the unreacted components.

Thereafter, typically, the obtained polymer is extruded and pelletized. The extrusion may be conducted in the manner generally known in the art, preferably in a twin screw extruder. One example of suitable twin screw extruders is a co-rotating twin screw extruder. Those are manufactured, among others, by Coperion or Japan Steel Works. Another example is a counter-rotating twin screw extruder. Such extruders are manufactured, among others, by Kobe Steel and Japan Steel Works. Before the extrusion at least part of the desired additives, as mentioned above, are preferably mixed with the polymer. The extruders typically include a melting section where the polymer is melted and a mixing section where the polymer melt is homogenised. Melting and homogenisation are achieved by introducing energy into the polymer. Suitable level of specific energy input (SEI) is from about 150 to about 450 kWh/ton polymer, preferably from 175 to 350 kWh/ton.

Film of the Invention

The film of the invention comprises at least one layer comprising the polymer composition. The film can be a monolayer film comprising the polymer composition or a multilayer film, wherein at least one layer comprises the polymer composition. The terms "monolayer film" and "multilayer film" have well known meanings in the art.

The layer of the monolayer or multilayer film of the invention may consist of the polymer composition as such or of a blend of the polymer composition together with further polymer(s). In case of blends, any further polymer is different from the polymer of ethylene (a) and is preferably a polyolefin. Part of the above mentioned additives, like processing aids, can optionally added to the polymer composition during the film preparation process.

Preferably, the at least one layer of the invention comprises at least 50 wt %, preferably at least 60 wt %, preferably at least 70 wt %, more preferably at least 80 wt %, of the polymer composition of the invention. More preferably said at least one layer of the film of invention consists of the polymer composition.

Accordingly, the films of the present invention may comprise a single layer (i.e. monolayer) or may be multi-layered. Multilayer films typically, and preferably, comprise at least 3 layers.

The films are preferably produced by any conventional film extrusion procedure known in the art including cast film and blown film extrusion. Most preferably, the film is a blown or cast film. E.g. the blown film is produced by extrusion through an annular die and blowing into a tubular film by forming a bubble which is collapsed between nip rollers after solidification. This film can then be slit, cut or converted (e.g. gusseted) as desired. Conventional film production techniques may be used in this regard. If the preferable blown or cast film is a multilayer film then the various layers are typically coextruded. The skilled man will be aware of suitable extrusion conditions.

The resulting films may have any thickness conventional in the art. The thickness of the film is not critical and depends on the end use. Thus, films may have a thickness of, for example, 300 μm or less, typically 6 to 200 μm, preferably 10 to 180 μm, e.g. 20 to 150 μm or 20 to 120 μm. If desired, the polymer of the invention enables thicknesses of less than 100 μm, e.g. less than 50 μm. Films of the invention with thickness even less than 20 μm can also be produced whilst maintaining good mechanical properties.

Determination Methods

Unless otherwise stated in the description or in the experimental part, the following methods were used for the property determinations of the polymer composition, polar polymer and/or any sample preparations thereof as specified in the text or experimental part.

Melt Flow Rate

The melt flow rate (MFR) is determined according to ISO 1133 and is indicated in g/10 min. The MFR is an indication of the flowability, and hence the processability, of the polymer.

The higher the melt flow rate, the lower the viscosity of the polymer. The MFR is determined at 190° C. for polyethylene. MFR may be determined at different loadings such as 2.16 kg (MFR$_2$), 5 kg (MFR$_5$) or 21.6 kg (MFR$_{21}$).

Density

Density of the polymer was measured according to ASTM; D792, Method B (density by balance at 23° C.) on compression moulded specimen prepared according to EN ISO 1872-2 (February 2007) and is given in kg/m$^3$.

Molecular Weights, Molecular Weight Distribution (Mn, Mw, MWD)—GPC

A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. ($c_{160° C.}$) was determined in the following way.

$$c_{160°C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by C. Jackson and H. G. Barth (C. Jackson and H. G. Barth, "Molecular Weight Sensitive Detectors" in: Handbook of Size Exclusion Chromatography and related techniques, C.-S. Wu, 2$^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i x M_i)}{\sum A_i} \quad (2)$$

$$M_z = \frac{\sum_{i=1}^{N} (A_i x M_i^2)}{\sum (A_i / M_i)} \quad (3)$$

For a constant elution volume interval $\Delta V_i$, where $A_i$ and $M_i$ are the chromatographic peak slice area and polyolefin molecular weight (MW) determined by GPC-LS.

Comonomer Contents:

Quantification of Microstructure by NMR Spectroscopy

Quantitative nuclear-magnetic resonance (NMR) spectroscopy was used to quantify the comonomer content of the polymers.

Quantitative $^{13}$C{$^1$H} NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {klimke06, parkinson07, castignolles09} Standard single-pulse excitation was employed utilising the NOE at short recycle delays {pollard04, klimke06} and the RS-HEPT decoupling scheme {fillip05,griffin07}. A total of 1024 (1 k) transients were acquired per spectra.

Quantitative $^{13}$C{$^1$H} NMR spectra were processed, integrated and relevant quantitative properties determined from the integrals. All chemical shifts are internally referenced to the bulk methylene signal (δ+) at 30.00 ppm.

The amount of ethylene was quantified using the integral of the methylene (δ+) sites at 30.00 ppm accounting for the number of reporting sites per monomer:

$$E = I_{\delta+}/2$$

the presence of isolated comonomer units is corrected for based on the number of isolated comonomer units present:

$$E\text{total} = E + (3*B + 2*H)/2$$

where B and H are defined for their respective comonomers. Correction for consecutive and non-consecutive comonomer incorporation, when present, is undertaken in a similar way. Characteristic signals corresponding to the incorporation of 1-butene were observed and the comonomer fraction calculated as the fraction of 1-butene in the polymer with respect to all monomer in the polymer:

$$fB\text{total} = (B\text{total}/(E\text{total} + B\text{total} + H\text{total}))$$

The amount isolated 1-butene incorporated in EEBEE sequences was quantified using the integral of the *B2 sites at 38.3 ppm accounting for the number of reporting sites per comonomer:

$$B = I_{*B2}$$

The amount consecutively incorporated 1-butene in EEBBEE sequences was quantified using the integral of the ααB2B2 site at 39.4 ppm accounting for the number of reporting sites per comonomer:

$$BB = 2*I_{\alpha\alpha B2B2}$$

The amount non consecutively incorporated 1-butene in EEBEBEE sequences was quantified using the integral of the ββB2B2 site at 24.7 ppm accounting for the number of reporting sites per comonomer:

$$BEB = 2*I_{\beta\beta B2B2}$$

Due to the overlap of the *B2 and *βB2B2 sites of isolated (EEBEE) and non-consecutively incorporated (EEBEBEE) 1-butene respectively the total amount of isolated 1-butene incorporation is corrected based on the amount of non-consecutive 1-butene present:

$$B = I_{*B2} - 2*I_{\beta\beta B2B2}$$

The total 1-butene content was calculated based on the sum of isolated, consecutive and non consecutively incorporated 1-butene:

$$B\text{total} = B + BB + BEB$$

The total mole fraction of 1-butene in the polymer was then calculated as:

$$fB=(Btotal/(Etotal+Btotal+Htotal)$$

Characteristic signals corresponding to the incorporation of 1-hexene were observed and the comonomer fraction calculated as the fraction of 1-hexene in the polymer with respect to all monomer in the polymer:

$$fHtotal=(Htotal/(Etotal+Btotal+Htotal)$$

The amount isolated 1-hexene incorporated in EEHEE sequences was quantified using the integral of the $*B4$ sites at 39.9 ppm accounting for the number of reporting sites per comonomer:

$$H=I_{*B4}$$

The amount consecutively incorporated 1-hexene in EEHHEE sequences was quantified using the integral of the $\alpha\alpha B4B4$ site at 40.5 ppm accounting for the number of reporting sites per comonomer:

$$HH=2*I\alpha\alpha B4B4$$

The amount non consecutively incorporated 1-hexene in EEHEHEE sequences was quantified using the integral of the $\beta\beta B4B4$ site at 24.7 ppm accounting for the number of reporting sites per comonomer:

$$HEH=2*I\beta\beta B4B4$$

The total mole fraction of 1-hexene in the polymer was then calculated as:

$$fH=(Htotal/(Etotal+Btotal+Htotal)$$

The mole percent comonomer incorporation is calculated from the mole fraction:

$$B[mol\%]=100*fB$$

$$H[mol\%]=100*fH$$

The weight percent comonomer incorporation is calculated from the mole fraction:

$$B[wt\%]=100*(fB*56.11)/((fB*56.11)+(fH*84.16)+((1-(fB+fH))*28.05))$$

$$H[wt\%]=100*(fH*84.16)/((fB*56.11)+(fH*84.16)+((1-(fB+fH))*28.05))$$

REFERENCES klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
busico01
Busico, V., Cipullo, R., Prog. Polym. Sci. 26 (2001) 443
busico97
Busico, V., Cipullo, R., Monaco, G., Vacatello, M., Segre, A. L., Macromolecules 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
resconi00
Resconi, L., Cavallo, L., Fait, A., Piemontesi, F., Chem. Rev. 2000, 100, 1253

Tensile modulus in machine direction (MD): was determined according to ISO 527-1 (with a specimen Type 2, 15 mm width at a speed of 1 mm/min) and ISO 527-3 (with a specimen Type 2, 15 mm width at a speed of 200 mm/min) using film samples with thickness of 40 μm. The film samples were produced as described below under "Experimental part".

Sealing properties: Hot tack temperature and Hot tack force were measured according to ASTM F 1921-98 (2004), method B, using film samples with thickness of 40 μm, which were produced as described below under "Experimental part". The following settings for Hot tack at hot tack temperature were used:

Hot Tack temperature (lowest temperature to get maximum Hot tack force) and Hot tack (maximum Hot tack force) were measured according to below settings:

| Q-name instrument: | Hot Tack - Sealing Tester | |
|---|---|---|
| Model: | J&B model 4000 MB | |
| Sealbar length: | 50 | [mm] |
| Seal bar width: | 5 | [mm] |
| Seal bar shape: | flat | |
| Coating of sealing bars: | NIPTEF ® | |
| Roughness of sealing bars: | 1 | [μm] |
| Sealing temperature: | variable | [° C.] |
| Sealing time: | 1 | [s] |
| Cooling time: | 0.2 | [s] |
| Sealing pressure: | 0.15 | [N/mm²] |
| Clamp separation rate: | 200 | [mm/s] |
| Sample width: | 25 | [mm] |

Sealing temperature: settings as followed below were used. The film samples of 40 μm thickness were produced as described below under "Experimental part".

| Q-name instrument: | Hot Tack - Sealing Tester 2 | |
|---|---|---|
| Model: | J&B model 4000 MB | |
| Sealbar length: | 50 | [mm] |
| Seal bar width: | 5 | [mm] |
| Seal bar shape: | flat | |
| Coating of sealing bars: | NIPTEF ® | |
| Roughness of sealing bars: | 1 | [μm] |
| Sealing temperature: | variable | [° C.] |
| Sealing time: | 1 | [s] |
| Cooling time: | 30 | [s] |
| Sealing pressure: | 0.4 | [N/mm²] |
| Clamp separation rate: | 42 | [mm/s] |
| Sample width: | 25 | [mm] |

Gel Content Determination:
Gel Count:
A cast film sample of about 70 μm thickness, is extruded and examined with a CCD (Charged-Coupled Device) camera, image processor and evaluation software (Instrument: OCS-FSA100, supplier OCS GmbH (Optical Control System)). The film defects are measured and classified according to their size (longest dimension).

Cast film preparation, extrusion parameters:
1. Output 25±4 g/min
2. Extruder temperature profile: 230-230-230-220-210 (Melt temp 223° C.)
3. Film thickness about 70 μm
4. Chill Roll temperature 55-65° C.
5. No Airkife needed Technical data for the extruder:
1. Screw type: 3 Zone, nitrated
2. Screw diameter: 25 mm
3. Screw length: 25D
4. Feeding zone: 10D
5. Compression zone: 4D
6. Die 100 mm The defects were classified according to the size (μm)/m$^2$:
100-299
300-599
600-999
>999

Rheological Properties:

Dynamic Shear Measurements (Frequency Sweep Measurements)

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.0154 and 500 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \tag{1}$$

If the applied strain is within the linear viscoelastic regime, the resulting sinusoidal stress response can be given by $$\sigma(t) = \sigma_0 \sin(\omega t + \delta) \tag{2}$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η", and the loss tangent, tan η, which can be expressed as follows:

$$G' = \frac{\sigma}{\gamma_0} \cos\delta \; [Pa] \tag{3}$$

$$G'' = \frac{\sigma}{\gamma_0} \sin\delta \; [Pa] \tag{4}$$

$$G^* = G' + iG'' \; [Pa] \tag{5}$$

$$\eta^* = \eta' + i\eta'' \; [Pa \cdot s] \tag{6}$$

$$\eta' = \frac{G''}{\omega} \; [Pa \cdot s] \tag{7}$$

$$\eta'' = \frac{G'}{\omega} \; [Pa \cdot s] \tag{8}$$

Besides the above mentioned rheological functions one can also determine other rheological parameters such as the so-called elasticity index EI(x). The elasticity index EI(x) is the value of the storage modulus, G', determined for a value of the loss modulus, G", of x kPa and can be described by equation 9.

$$EI(x) = G'(\text{for } G'' = x \text{ kPa})[Pa] \tag{9}$$

For example, the EI(5 kPa) is defined by the value of the storage modulus G', determined for a value of G" equal to 5 kPa.

The determination of so-called Shear Thinning Indexes is done, as described in equation 10.

$$SHI(x/y) = \frac{Eta^* \text{ for } (G^* = x \text{ kPa})}{Eta^* \text{ for } (G^* = y \text{ kPa})} \; [Pa] \tag{10}$$

For example, the $SHI_{(2.7/210)}$ is defined by the value of the complex viscosity, in Pa·s, determined for a value of G* equal to 2.7 kPa, divided by the value of the complex viscosity, in Pa·s, determined for a value of G* equal to 210 kPa.

The values of storage modulus (G'), loss modulus (G"), complex modulus (G*) and complex viscosity (η*) were obtained as a function of frequency (ω).

Thereby, e.g. $\eta^*_{300 \, rad/s}$ (eta*$_{300 \, rad/s}$) is used as abbreviation for the complex viscosity at the frequency of 300 rad/s and $\eta^*_{0.05 \, rad/s}$ (eta*$_{0.05 \, rad/s}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

EXPERIMENTAL PART

Preparation of Examples

Cat. Example: Catalyst Preparation 130 grams of a metallocene complex bis(1-methyl-3-n-butylcyclopentadienyl) zirconium (IV) dichloride (CAS no. 151840-68-5), and 9.67 kg of a 30% solution of commercial methylalumoxane (MAO) in toluene were combined and 3.18 kg dry, purified toluene was added. The thus obtained complex solution was added onto 17 kg silica carrier Sylopol 55 SJ (supplied by Grace) by very slow uniform spraying over 2 hours. The temperature was kept below 30° C. The mixture was allowed to react for 3 hours after complex addition at 30° C.

Polymerisation: Inventive Example 1: Inventive Multimodal Polymer of Ethylene with 1-Butene and 1-Hexene Comonomers Prepolymerisation: A loop reactor having a volume of 50 dm$^3$ was operated at a temperature of 60° C. and a pressure of 65 bar. Into the reactor were introduced 2.5 kg/h ethylene, 30 kg/h propane diluent and 50 g/h 1-butene. Also 16 g/h of catalyst of cat. example was introduced into the reactor. The polymer production rate was about 2 kg/h.

Polymerisation:

The slurry from the reactor was withdrawn intermittently and directed into a loop reactor having a volume of 500 dm$^3$ and which was operated at 85° C. temperature and 64 bar pressure. Into the reactor was further added 25 kg/h of propane and ethylene together with 1-butene comonomer and hydrogen so that the ethylene content in the reaction mixture was 4 mol-%, the molar ratio of hydrogen to ethylene was 0.3 mol/kmol and the ratio of 1-butene to ethylene was 110 mol/kmol. The production rate of ethylene copolymer having a melt index MFR$_2$ of 6 g/10 min and density of 938 kg/m3 was 50 kg/h.

The slurry was withdrawn from the loop reactor intermittently by using settling legs and directed to a flash vessel operated at a temperature of 50° C. and a pressure of 3 bar. From there the polymer was directed to a gas phase reactor (GPR) operated at a pressure of 20 bar and a temperature of 75° C. Additional ethylene, 1-hexene comonomer, nitrogen as inert gas and hydrogen were added so that the ethylene content in the reaction mixture was 37 mol-%, the ratio of hydrogen to ethylene was 0.4 mol/kmol and the ratio of 1-hexene to ethylene was 38 mol/kmol. The polymer production rate in the gas phase reactor was 70 kg/h and thus the total polymer withdrawal rate from the gas phase reactor was 122 kg/h. The polymer had a melt index MFR$_2$ of 1.5 g/10 min and a density of 918 kg/m$^3$. The production split (% Loop/% GPR components) was 42/58. The amount of the prepolymerisation product was calculated to the amount of the Loop product.

The polymer was mixed with 2400 ppm of Irganox B561. Then it was compounded and extruded under nitrogen atmosphere to pellets by using a CIMP90 extruder so that the SEI was 230 kWh/kg and the melt temperature 250° C. (polymer composition of example 1) The inventive polymers of example 2 and example 3 and the final polymer compositions thereof as well as comparative example the final polymer composition thereof were produced as the inventive example 1, but using the polymerisation conditions as given in table 1.

Examples of Inventive Blend Compositions Inv.blend 1 and Inv.blend 2:

Inv.blend 1:

90 wt % of the final polymer composition of inventive example 1 and 10 wt % of commercial linear low density polyethylene produced in a high pressure process, sold under tradename FT5230 (supplier Borealis, MFR$_2$: 0.75 g/10 min; Density: 923 kg/m$^3$, Tensile modulus MD of 230 MPa). Weight %'s are based on the combined amount of the two polymer components.

Inv.blend 2:

80 wt % of the final polymer composition of inventive example 1 and 20 wt % of commercial linear low density polyethylene produced in a high pressure process, sold under tradename LDPE LD150BW (supplier ExxonMobil, MFR$_2$: 0.75 g/10 min; Density: 923 kg/m$^3$, Tensile modulus MD of 240 MPa). Weight %'s are based on the combined amount of the two polymer components.

Film Sample Preparation for Tensile Modulus, Hot Tack Temperature, Hot Tack and Sealing Initiation Measurements The test films consisting of the inventive polymer compositions (final polymer composition), inventive blend compositions and respective comparative or reference polymer compositions of 40 μm thickness, were prepared using 5 layer coextrusion blown film line (Hosokawa Alpine)

The equipment had 5 extruders, 4 extruders of the equipment screw diameters of 65 mm and 1 extruder of 90 mm (middle extruder is the biggest one). The die width was: 400 mm, die gap 1.8 mm, film thickness 40 μm.

blow-up ratio (BUR): 2.5 temperature profile, ° C.: 30-190-190-190-190-190-195-195-195—same extruder temperature profile for all 5 extruders, with a throughput of 60 kg/h per extruder die temperature 205° C., same die temperature profile for all 5 extruders FLH: 2 times die diameter In case of the production of the film samples of the inventive blend compostions, the two polymer components were dry-blended before feeding to the extruder.

TABLE 1

Polymersation conditions and polymer properties

| | Unit | Inv. Example 1 | Inv. Example 2 | Inv. Example 3 | Comparative ex. |
|---|---|---|---|---|---|
| Polymerisation conditions and polymer properties | | | | | |
| Prepolymerisation | | | Same as ex. 1 | Same as ex. 1 | Same as ex. 1 |
| Loop H2/C2 | Mol/kmol | 0.3 | 0.3 | 0.3 | 1 |
| Loop C4/C2 | Mol/kmol | 110 | 105 | 110 | 130 |

TABLE 1-continued

Polymersation conditions and polymer properties

|  | Unit | Inv. Example 1 | Inv. Example 2 | Inv. Example 3 | Comparative ex. |
|---|---|---|---|---|---|
| Loop $MFR_2$ | g/10 min | 6 | 7 | 6 | 80 |
| Loop Density | kg/m3 | 938 | 940 | 938 | 935 |
| C4 content in Loop | mol % | 0.75 | 0.70 | 0.75 | 0.85 |
| GPR H2/C2 | Mol/kmol | 0.4 | 0.3 | 0.3 | 0.2 |
| GPR C6/C2 | Mol/kmol | 38 | 33 | 23 | 42 |
| $MFR_2$ of GPR (calculated) | g/10 min | 0.64 |  | 0.64 | 0.18 |
| Production split (Loop/GPR) | wt-%/wt-% | 42/58 | 45/55 | 42/58 | 50/50 |
| Final $MFR_2$ | g/10 min | 1.5 | 1.2 | 0.9 | 1.0 |
| Final Density | kg/m3 | 918 | 922 | 926 | 918 |
| Properties of the final polymer composition |  |  |  |  |  |
| $MFR_2$ | g/10 min | 1.5 | 1.2 | 0.9 | 1.0 |
| Density | kg/m3 | 918 | 922 | 926 | 918 |
| $MFR_{21}/MFR_2$ ratio |  | 21 | 20 | 19 | 50 |
| Comonomer content of final product | mol-% | 2.9 | 2.5 | 2 | 3 |
| $MFR_2$ ratio (first/final) |  | 4.6 | 5.8 | 4.6 | 80.0 |
| Comonomer content ratio (first/final) | mol %/mol % | 0.26 | 0.28 | 0.38 | 0.28 |
| MWD (Mw/Mn) |  | 3.7 | 3.6 | 3.6 | 5.8 |
| Gel count/$m^2$ (600-999 μm) | pcs/$m^2$ | 1 | 1 | 2 | >100 |
| Gel count/$m^2$ (>999 μm) | pcs/$m^2$ | 0 | 0 | 0 | >10 |
| $MFR_{21,6}$ | g/10 min | 31.5 | 24 | 17.1 | 50 |
| $SHI_{2.7/210}$ |  | 3.0 | 3.1 | 3.5 | 5.3 |
| Tensile modulus | MPa | 227 | 267 | 302 | 218 |

TABLE 2

Hot tack temperature and Hot tack force

| Product | MFR (190/2, 16) (in g/10 min) | Density (in kg/$m^3$) | Tensile Modulus MD (in Mpa) | Hot tack temperatures (in °C.) | Hot tack force (in N) |
|---|---|---|---|---|---|
| Inv. Example 1 | 1.5 | 918 | 227 | 95 | 3.14 |
| Inv. Example 2 | 1.2 | 922 | 267 | 103 | 2.69 |
| Inv. Example 3 | 0.9 | 926 | 302 | 110 | 2.29 |
| Inv. blend. Ex. 1* |  |  |  | 95 | 4.04 |
| Inv. blend. Ex. 2* |  |  |  | 100 | 3.96 |
| Comparative ex. | 1.0 | 918 | 218 | 103 | 2.37 |
| Ref. 1 | 1.0 | 918 | 192 | 101 | 2.28 |
| Ref. 2 | 1.2 | 920 | 224 | 104 | 2.57 |
| Ref. 3 | 1.0 | 916 | 197 | 99 | 2.89 |
| Ref. 4 | 1.0 | 920 | 229 | 104 | 1.71 |
| Ref. 5 | 1.0 | 918 | 195 | 103 | 2.42 |
| Ref. 6 | 1.3 | 927 | 332 | 112 | 1.93 |

*MFR, density and Tensile modulus of each polymer component are given above.

TABLE 3

Power consumption

|  |  | Ref 2 | Ref 1 | Inv. Ex 1 | Ref 5 | Ref 4 | Ref 3 | Ref 6 | Inv. Ex 2 |
|---|---|---|---|---|---|---|---|---|---|
| Power extrusion line Total | kW | 118 | 134.7 | 115.5 | 131.3 | 132.2 | 126.4 | 119.2 | 149 |

TABLE 3-continued

Power consumption

| | | Ref 2 | Ref 1 | Inv. Ex 1 | Ref 5 | Ref 4 | Ref 3 | Ref 6 | Inv. Ex 2 |
|---|---|---|---|---|---|---|---|---|---|
| Specific Energy input (Extruders 1-5) | kWh/kg | 0.294 | 0.308 | 0.275 | 0.293 | 0.293 | 0.279 | 0.268 | 0.273 |

Commercially available unimodal film LLDPE grades as references

Ref. 1 is a unimodal linear low density copolymer of ethylene with 1-hexene comonomer produced with a metallocene catalyst Ref. 2 is a unimodal linear low density copolymer of ethylene with 1-hexene comonomer produced with a metallocene catalyst Ref. 3 is a unimodal linear low density copolymer of ethylene with 1-octene comonomer produced with a metallocene catalyst Ref. 4 is a unimodal linear low density copolymer of ethylene with 1-octene comonomer produced with a Ziegler-Natta catalyst Ref. 5 is a unimodal linear low density copolymer of ethylene with 1-hexene comonomer produced with a metallocene catalyst Ref. 6 is a unimodal linear low density copolymer of ethylene with 1-hexene comonomer produced with a metallocene catalyst.

The invention claimed is:

1. A polymer composition comprising:
   (a) a multimodal polymer of ethylene with at least two different comonomers selected from alpha-olefins having from 4 to 10 carbon atoms,
   which has
   a) a melt flow rate $MFR_2$ of 0.5 to 10 g/10 min (according to ISO 1133 at 190° C. under 2.16 kg load),
   b) a melt flow ratio $MFR_{21}/MFR_2$ of 13 to 30 ($MFR_{21}$ at 190° C. under 21.6 kg load), and
   c) a molecular weight distribution MWD defined by the ratio (Mw/Mn) of the weight average molecular weight (Mw) to the number average molecular weight (Mn), determined by Gel Permeation Chromatography (GPC), of 5 or less;
   wherein:
   the multimodal polymer of ethylene (a) comprises at least an ethylene polymer component (A) and an ethylene polymer component (B),
   the $MFR_2$ of the ethylene polymer component (A) is different from the $MFR_2$ of the ethylene polymer component (B); and
   the alpha-olefin comonomer having from 4 to 10 carbon atoms of ethylene polymer component (A) is different from the alpha-olefin comonomer having from 4 to 10 carbon atoms of ethylene polymer component (B).

2. The polymer composition according to claim 1, wherein the ethylene polymer component (A) has a $MFR_2$ of 1 to 50 g/10 min.

3. The polymer composition according to claim 1, wherein the $MFR_2$ of ethylene polymer component (A) is higher than the $MFR_2$ of ethylene polymer component (B).

4. The polymer composition according to claim 1, wherein the alpha-olefin comonomer of the ethylene polymer component (A) is 1-butene and the alpha-olefin comonomer of the ethylene polymer component (B) is 1-hexene.

5. The polymer composition according to claim 1, wherein the multimodal polymer of ethylene (a) is further multimodal with respect to the comonomer content.

6. The polymer composition according to claim 1, wherein the ratio of [the amount (mol %) of alpha-olefin comonomer having from 4 to 10 carbon atoms comonomer present in ethylene polymer component (A)] to [the amount (mol %) of at least two alpha-olefin comonomers having from 4 to 10 carbon atoms of the final multimodal polymer of ethylene (a)] is of 0.2 to 0.6.

7. The polymer composition according to claim 1, wherein the amount (mol %) of alpha-olefin comonomer having from 4 to 10 carbon atoms present in the ethylene polymer component (A) is of 0.03 to 5.0 mol %.

8. The polymer composition according to claim 1, wherein the multimodal polymer of ethylene (a) is further multimodal with respect to density.

9. The polymer composition according to claim 1, wherein the density of the ethylene polymer component (A) is of 925 to 950 kg/m³.

10. The polymer composition according to claim 1, wherein the density of the multimodal polymer of ethylene (a) is of 910 to 935 kg/m³.

11. The polymer composition according to claim 1, wherein the multimodal polymer of ethylene (a) has $MFR_{21}/MFR_2$ of 15 to 30.

12. The polymer composition according to claim 1, wherein the multimodal polymer of ethylene (a) is multimodal with respect to MFR, type of the comonomer, comonomer content and density.

13. The polymer composition according to claim 1, wherein polymer composition has a the tensile modulus in machine direction (MD) of 200 to 350 MPa when determined according to ISO 527-1 and ISO 527-3 and measured from a film sample (40 μm thickness) consisting of the polymer composition.

14. The polymer composition according to claim 1, wherein the polymer composition, has a shear thinning index $SHI_{2.7/210}$ of 1.5 to 7 when determined according to ISO 6721-1 and ISO 6721-10.

15. The polymer composition according to claim 1, wherein the multimodal polymer of ethylene (a) is produced using a single site catalyst.

16. An article comprising the polymer composition according to claim 1.

17. A film comprising at least one layer which comprises the polymer composition according to claim 1.

* * * * *